(12) United States Patent
Tu (10) Patent No.: US 8,296,596 B2
(45) Date of Patent: Oct. 23, 2012

(54) COMPUTER SYSTEM CAPABLE OF DYNAMICALLY MODULATING CORE-VOLTAGE AND CLOCK FREQUENCY OF CPU

(75) Inventor: Hung-Jan Tu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 474 days.

(21) Appl. No.: 12/538,983

(22) Filed: Aug. 11, 2009

(65) Prior Publication Data

US 2010/0049997 A1    Feb. 25, 2010

(30) Foreign Application Priority Data

Aug. 22, 2008   (TW) ................................ 97132268 A (51) Int. Cl.
*G06F 1/26*     (2006.01)
(52) U.S. Cl. .................... 713/340; 713/300; 713/330
(58) Field of Classification Search .................... 713/300
See application file for complete search history.

(56) References Cited

U.S. PATENT DOCUMENTS

| | | | | |
|---|---|---|---|---|
| 6,513,124 B1 * | 1/2003 | Furuichi et al. | ............... | 713/322 |
| 6,574,739 B1 * | 6/2003 | Kung et al. | ................... | 713/322 |
| 6,829,713 B2 * | 12/2004 | Cooper et al. | ................ | 713/320 |
| 6,845,456 B1 * | 1/2005 | Menezes et al. | ............. | 713/320 |
| 7,222,254 B2 * | 5/2007 | Kurts et al. | ................... | 713/600 |
| 7,254,721 B1 * | 8/2007 | Tobias et al. | .................. | 713/300 |
| 7,337,335 B2 * | 2/2008 | Jorgenson et al. | ............ | 713/300 |
| 7,600,141 B2 * | 10/2009 | Flynn | ............................. | 713/322 |
| 7,647,513 B2 * | 1/2010 | Tobias et al. | .................. | 713/300 |
| 7,711,966 B2 * | 5/2010 | Prabhakaran et al. | ........ | 713/300 |
| 7,779,279 B2 * | 8/2010 | Huang et al. | .................. | 713/310 |
| 7,844,846 B2 * | 11/2010 | Morrell | ......................... | 713/340 |
| 2006/0047987 A1 * | 3/2006 | Prabhakaran et al. | ........ | 713/322 |
| 2006/0136770 A1 * | 6/2006 | Jorgenson et al. | ............ | 713/500 |
| 2007/0088962 A1 * | 4/2007 | Yu | .................................... | 713/300 |
| 2009/0077402 A1 * | 3/2009 | Huang et al. | .................. | 713/320 |
| 2009/0199033 A1 * | 8/2009 | Borkar et al. | ................. | 713/340 |

FOREIGN PATENT DOCUMENTS

CN         1851579 A       10/2006
TW         200727108        7/2007

* cited by examiner

*Primary Examiner* — Ryan Stiglic
(74) *Attorney, Agent, or Firm* — Jianq Chyun IP Office (57) ABSTRACT

A computer system capable of dynamically modulating a core-voltage and a clock frequency of a CPU is provided. The computer system includes a CPU capable of receiving a voltage and then generating a feedback voltage; a PWM controller capable of modulating and outputting the voltage in response to a compensated-feedback voltage, and capable of monitoring a real-time load of CPU and then generating a power monitor signal; an embedded controller for determining a power consumption of the CPU in response to the power monitor signal and then generating a control signal and a system interrupt notify signal; a voltage modulation unit capable of generating a compensate voltage in response to the control signal; a clock-frequency generator for generating a clock with a first frequency to the central processing unit; and, a BIOS for modulating the first frequency of the clock based on the system interrupt notify signal; wherein the compensated-feedback voltage is equal to the feedback voltage added to the compensate voltage.

16 Claims, 6 Drawing Sheets

| VCORE_OV1 | VCORE_OV2 | VCORE_SEL0 | VCORE_SEL1 | $V_{cvf}$ |
|---|---|---|---|---|
| H | H | L | L | $V_{core\_f} - 75mv$ |
| H | H | L | H | $V_{core\_f} - 50mv$ |
| H | H | H | L | $V_{core\_f} - 25mv$ |
| H | H | H | H | $V_{core\_f}$ |
| L | L | H | H | $V_{core\_f} + 75mv$ |
| L | H | H | H | $V_{core\_f} + 50mv$ |
| H | L | H | H | $V_{core\_f} + 25mv$ |

FIG.4B

COMPUTER SYSTEM CAPABLE OF DYNAMICALLY MODULATING CORE-VOLTAGE AND CLOCK FREQUENCY OF CPU

FIELD OF THE INVENTION

The present invention relates to a computer system capable of modulating a core voltage and a clock frequency of a central processing unit (CPU), and more particularly to a computer system capable of dynamically modulating the core voltage and the clock frequency of the CPU based on the load of the CPU.

BACKGROUND OF THE INVENTION

Figure 1:
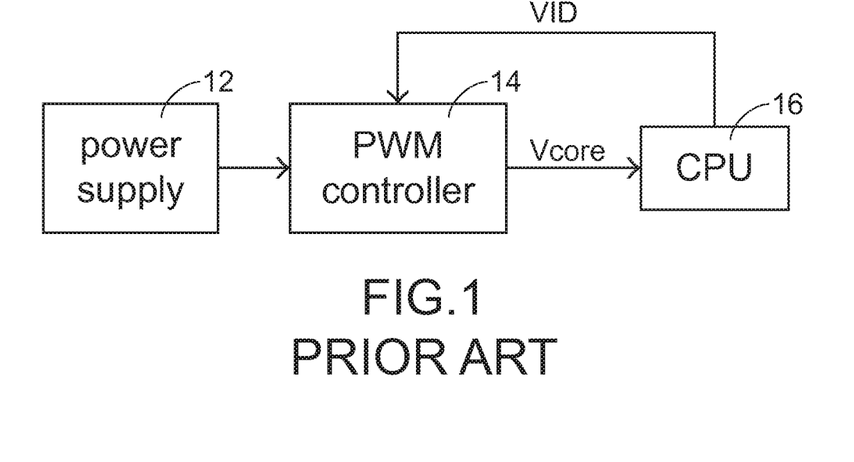
FIG. 1 is a block diagram illustrating a conventional power control circuit of a CPU in a computer system.

FIG. 1 is a block diagram illustrating a conventional power control circuit of a CPU in a computer system. The power providing circuit comprises a power supply 12, a pulse-width-modulation (PWM) controller 14, and a CPU 16. The PWM controller 14 is introduced in the computer system because the PWM controller 14 can dynamically modulate the core voltage (Vcore) to the CPU 16 according to the real-time load of the CPU 16. In other words, the PWM controller 14 can provide a relative large core voltage (Vcore) to the CPU 16 if the load of the CPU 16 is relative high; and, the PWM controller 14 can provide a relative small core voltage (Vcore) to the CPU 16 if the load of the CPU 16 is relative low. The real-time road of the CPU 16 can be aware of via a voltage identification (VID) signal that is outputted from the CPU 16, where the CPU capable of outputting the VID signal is categorized to a CPU with the Enhance Intel Speed Step Technology (EIST) function that is developed by Intel. Via the VID signal, the PWM controller 14 can detect the real-time load of the CPU 16 and dynamically modulate the core voltage (Vcore) to the CPU 16 if the CPU 16 has the EIST function.

If the load of the CPU is extremely high, the clock frequency of the CPU is defined in the highest-frequency mode (HFM) and the power consumption of the CPU is defined at a largest value. If the load of the CPU is extremely low, the clock frequency of the CPU is defined in the lowest-frequency mode (LFM) and the power consumption of the CPU is defined at a smallest value. However, the CPU is not limited to operate at the clock frequency in the range between the highest-frequency mode (HFM) and the lowest-frequency mode (LFM). According to the practical operations or experiments, the CPU can work normally if the clock frequency applied to the CPU is higher than the clock frequency in the highest-frequency mode (HFM). In other words, the CPU not only can work normally but also has a better performance if the clock frequency is raised up 10% or 20% higher than the clock frequency in the highest-frequency mode (HFM), where operating the CPU at a clock frequency higher than the clock frequency in the highest-frequency mode (HFM) is defined as an over clocking. Similarly, the CPU can work normally if the clock frequency applied to the CPU is lower than the clock frequency in the lowest-frequency mode (LFM). In other words, the CPU not only can work normally but also has a better power saving if the clock frequency is lowered down 10% or 20% less than the clock frequency in the lowest-frequency mode (LFM), where operating the CPU at a clock frequency lower than the clock frequency in the lowest-frequency mode (LFM) is defined as an under clocking.

Besides, the over clocking/or the under clocking must be accompanied with the modulation of the core voltage (Vcore) and the core voltage (Vcore) is necessary modulated first before the modulation of the clock frequency according to the specification of CPU. In other words, before executing the over clocking to the CPU, the core voltage (Vcore) applied to the CPU must be raised up first. On the contrary, it needs to execute the under clocking to the CPU first, the core voltage (Vcore) applied to the CPU be lowered down.

Figure 2:
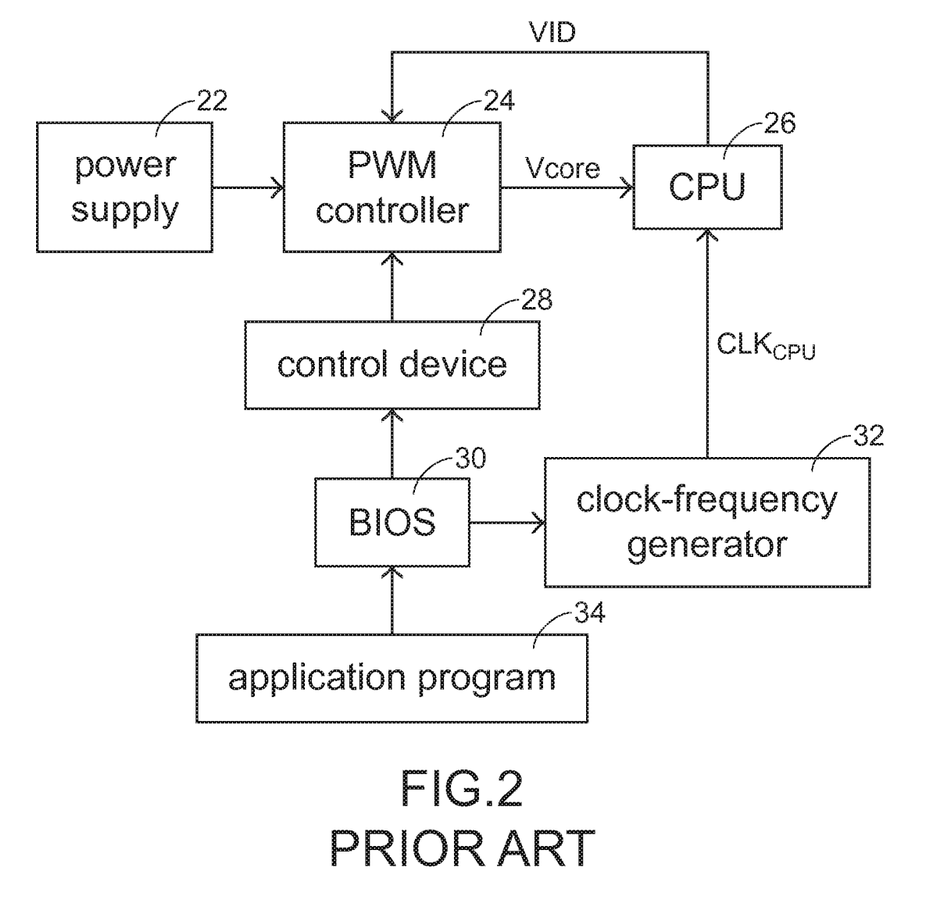
FIG. 2 is a block diagram illustrating a conventional computer system executing the over clocking/or under clocking to a CPU.

FIG. 2 is a block diagram illustrating a conventional computer system executing the over clocking/or under clocking to a CPU. The computer system comprises a power supply 22, a PWM controller 24, a CPU 26, a control device 28, a basic-input-output-system (BIOS) 30, a clock-frequency generator 32, and an application program 34. If user desires a better performance of the computer system and plans to execute the over clocking to the CPU 26, the raising up of the core voltage (Vcore) applied to the CPU 26 must be done first. User can rise up the core voltage (Vcore) via a setup menu of the BIOS 30. That is, user can select a relative high core voltage (Vcore) provided by the setup menu of the BIOS 30. Once the relative high core voltage (Vcore) on the setup menu of the BIOS 30 is selected, the BIOS 30 then informs the control device 28 to ask the PWM controller 24 to provide the relative high core voltage (Vcore) to the CPU 26 when the computer system entering to the operation system (OS) next time. Because the core voltage (Vcore) is modulated to higher, then user can execute the over clocking (10% or 20% higher than the highest-frequency mode (HFM)). The over clocking can be executed via the application program 34. Once a relative high clock frequency is selected (or key-in) in the application program 34, a relative high clock frequency ($CLK_{CPU}$) is then outputted to the CPU 26 from the clock-frequency generator 32, so as the over clocking of the CPU 26 is done.

Similarly, if user desires a better power saving of the computer system and plans to execute the under clocking to the CPU 26, the lowering down of the core voltage (Vcore) applied to the CPU 26 must be done after executing the under clocking. The lowering down of the core voltage (Vcore) can be done according to the same manner described above in the process of rising up of the core voltage (Vcore), so as no unnecessary details are given here.

However, once the core voltage (Vcore) is selected via the BIOS 30 and the computer system enters to the operation system (OS), the core voltage (Vcore) cannot be modulated again unless the computer system entering to the BIOS 30 again. In other words, once the relative high core voltage (Vcore) is selected by user based on a desire of a better performance, a power waste may be happened if the CPU is not necessary to operate at the relative high core voltage (Vcore). Similarly, once the relative low core voltage (Vcore) is selected by user based on a desire of power saving, a poor performance may be happened if the CPU cannot obtain enough core voltage (Vcore).

Furthermore, according to the specification of CPU, the core voltage (Vcore) is necessary to raise up before the execution of the over clocking to CPU and the core voltage (Vcore) is necessary to lower down after the execution of the under clocking to CPU. However, according to the practical operations and experiments, the raising up/or the lowering down of the core voltage (Vcore) is not necessary to accompany with the over clocking/or the under clocking. In other words, user still can execute the over clocking to the CPU without rising up the core voltage (Vcore). In some special computer systems, the over clocking of the CPU even can be done if the core voltage (Vcore) is lowered down.

Furthermore, because the relative old version of the CPU is without EIST function and cannot output the VID signal, the conventional process of the modulation of the core voltage (Vcore)/clock frequency cannot be applied to the CPUs without the EIST function.

SUMMARY OF THE INVENTION

Therefore, the present invention relates to a computer system capable of dynamically modulating the core voltage and the clock frequency of the CPU based on the real-time load of the CPU.

The present invention provides a computer system capable of modulating a voltage and a frequency of a central processing unit, comprising: a central processing unit capable of receiving a voltage and then generating a feedback voltage; a pulse-width-modulation controller capable of modulating and outputting the voltage in response to a compensated-feedback voltage, and capable of monitoring a real-time load of the central processing unit and then generating a power monitor signal; an embedded controller for determining a power consumption of the central processing unit in response to the power monitor signal and then generating a control signal and a system interrupt notify signal; a voltage modulation unit capable of generating a compensate voltage in response to the control signal; a clock-frequency generator for generating a clock with a first frequency to the central processing unit; and a basic-input-output-system for modulating the first frequency of the clock based on the system interrupt notify signal; wherein the compensated-feedback voltage is equal to the feedback voltage added to the compensate voltage.

The present invention provides a computer system capable of modulating a voltage of a central processing unit, comprising: a central processing unit capable of receiving the voltage and then generating a feedback voltage; a pulse-width-modulation controller capable of modulating and outputting the voltage in response to a compensated-feedback voltage, and capable of monitoring a real-time load of the central processing unit and then generating a power monitor signal; an embedded controller for determining a power consumption of the central processing unit in response to the power monitor signal and then generating a control signal; and a voltage modulation unit capable of generating a compensate voltage in response to the control signal; wherein the compensated-feedback voltage is equal to the feedback voltage added to the compensate voltage.

The present invention provides a computer system capable of modulating a frequency of a central processing unit, comprising: a central processing unit capable of receiving a voltage and then generating a feedback voltage; a pulse-width-modulation controller capable of modulating and outputting the voltage in response to a compensated-feedback voltage, and capable of monitoring a real-time load of the central processing unit and then generating a power monitor signal; an embedded controller for determining a power consumption of the central processing unit in response to the power monitor signal and then generating a system interrupt notify signal; a clock-frequency generator for generating a clock with a first frequency to the central processing unit; and a basic-input-output-system for modulating the first frequency of the clock based on the system interrupt notify signal.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 3A:
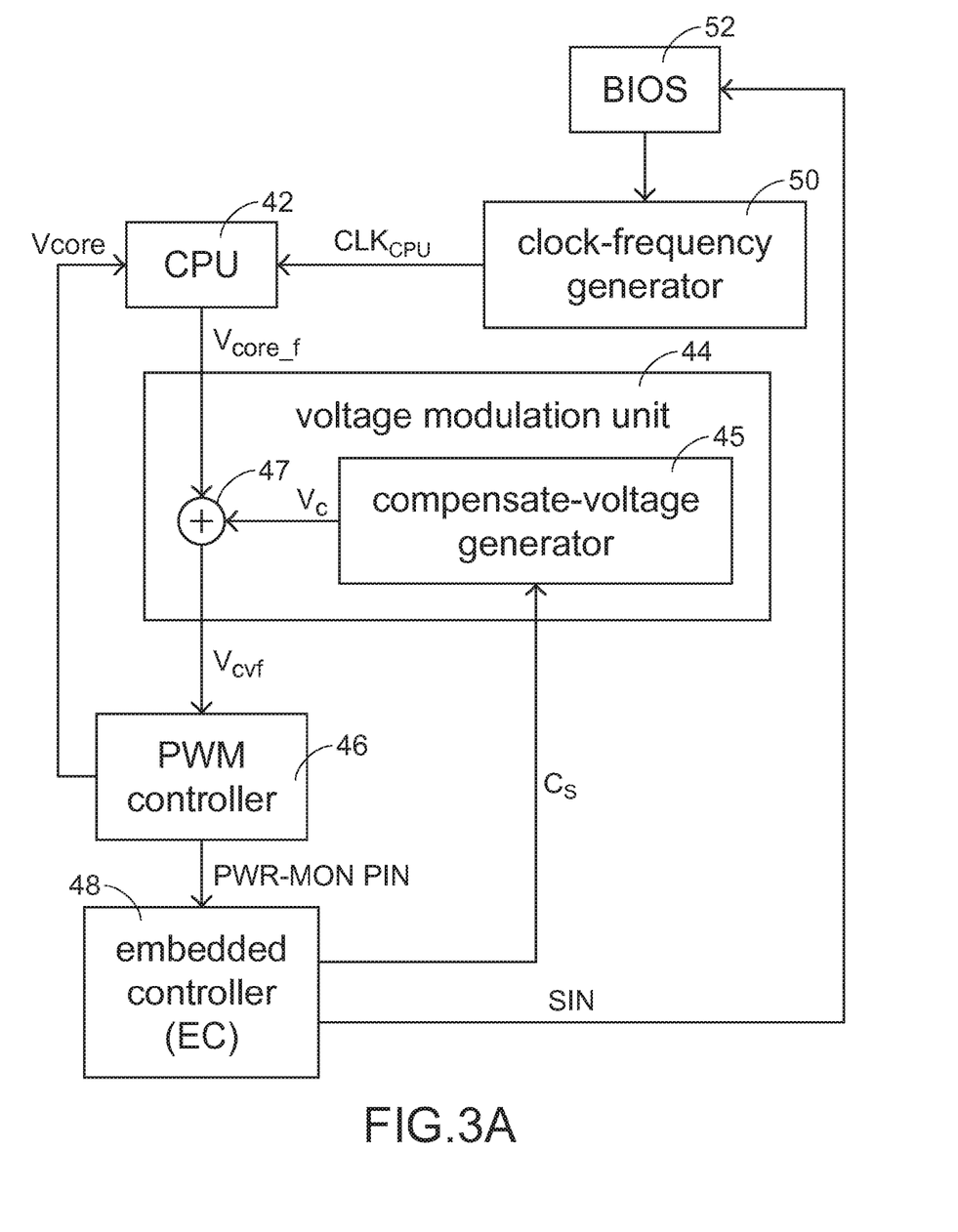
FIG. 3A is a functional block diagram illustrating a computer system of the present invention capable of modulating the core voltage (Vcore) and the clock frequency of the CPU.

FIG. 3A is a functional block diagram illustrating a computer system of the present invention capable of modulating the core voltage (Vcore) and the clock frequency applied to a CPU. The computer system of the present invention comprises a CPU 42, a voltage modulation unit 44, a PWM controller 46, an embedded controller (EC) 48, a clock-frequency generator 50, and a BIOS 52; where the CPU 42 is without the EIST function.

Because the CPU 42 is without the EIST function, the real-time load (or the power consumption) of the CPU 42 cannot be aware of via detecting the VID signal. For imparting the detection of the load (or the power consumption) of the CPU 42, the embedded controller (EC) 48, for estimating the load (or the power consumption) of the CPU 42 via an algorithm implemented in the embedded controller (EC) 48 and a power-monitor signal outputted from a power-monitor pin (PWR-MON PIN) of the PWM controller 46, is arranged in the computer system of the present invention.

After the power consumption of the CPU 42 is estimated by the embedded controller (EC) 48, the estimated power consumption of the CPU 42 is then compared with a predefined maximum-power value and a predefined minimum-power value which are already installed in the embedded controller (EC) 48, where the maximum-power value stands for the power consumption of the CPU 42 when the clock frequency is in the highest-frequency mode (HFM); the minimum-power value stands for the power consumption of the CPU 42 when the clock frequency is in the lowest-frequency mode (HFM). If the estimated power consumption of the CPU 42 is in the range between the predefined maximum-power value and the predefined minimum-power value or the power consumption indicating the clock frequency of the CPU 42 is in the range between the highest-frequency mode (HFM) and the lowest-frequency mode (LFM), then there is no need to execute the over clocking/or the under clocking to the CPU 42. Afterward, a control signal (Cs) with a specific configuration, for informing the voltage modulation unit 44 not to compensate the Vcore-feedback voltage (Vcore_f) outputted from the CPU 42, is outputted to the voltage modulation unit 44 from the embedded controller (EC) 48; where the Vcore-feedback voltage (Vcore_f) stands for the real core voltage (Vcore) received by the CPU 42.

Because the compensation is not needed to execute to the Vcore-feedback voltage (Vcore_f), an zero compensate voltage (Vc) is outputted from the compensate-voltage generator 45 and then added to the Vcore-feedback voltage (Vcore_f) via the adder 47, so as a compensated-Vcore-feedback voltage (Vcvf), with a value equal to the Vcore-feedback voltage (Vcore_f), is outputted to the PWM controller 46 from the voltage modulation unit 44. Because there is no any modulation to the compensated-Vcore-feedback voltage (Vcvf) due to the compensate voltage (Vc) is zero, the value of the core voltage (Vcore) outputted to the CPU 42 from the PWM controller 46 is accordingly without any value modulation. Furthermore, because the estimated power consumption of the CPU 42 is in the range between the predefined maximum-power value and the predefined minimum-power value and the over clocking/or the under clocking is not needed to execute to the CPU 42, a system interrupt notify (SIN), for informing the BIOS 52 to ask the frequency generator 50 to modulate the clock frequency ($CLK_{CPU}$), will not be outputted to the BIOS 52 from the embedded controller (EC) 48, so as the clock frequency ($CLK_{CPU}$) outputted to the CPU 42 from the frequency generator 50 is without any value modulation.

If the power consumption of the CPU 42 is estimated up to the predefined maximum-power value or the estimated power consumption indicating the clock frequency of the CPU 42 is in the highest-frequency mode (HFM), then the over clocking is necessary to execute to the CPU 42. As described above, the modulation of the core voltage (Vcore) must be executed prior to the over clocking, therefore, a control signal (Cs) with a specific configuration, for informing the voltage modulation unit 44 to execute a positive/or negative compensation to the Vcore-feedback voltage (Vcore_f) based on a requirement mechanism, is then outputted to the voltage modulation unit 44 from the embedded controller (EC) 48. For example, if the requirement mechanism indicates a better performance is more concerned and a higher core voltage (Vcore) is needed to provide to the CPU 42 before the execution of the over clocking to the CPU 42, a control signal (Cs) with a specific configuration, for informing the voltage modulation unit 44 to execute an negative compensation to the Vcore feedback voltage (Vcore_f), is then outputted to the voltage modulation unit 44 from the embedded controller (EC) 48. Because the negative compensation, the compensated-Vcore-feedback voltage (Vcvf) is accordingly less than the Vcore-feedback voltage (Vcore_f), so as a relative high core voltage (Vcore) is outputted to the CPU 42 from the PWM controller 46 due to a close-loop equivalence between the PWM controller 46 and the CPU 42.

On the other hand, if the requirement mechanism indicates the power saving is more concerned and a smaller core voltage (Vcore) is needed to provide to the CPU 42 before the execution of the over clocking to the CPU 42, a control signal (Cs) with a specific configuration, for informing the voltage modulation unit 44 to execute a positive compensation to the Vcore-feedback voltage (Vcore_f), is outputted to the voltage modulation unit 44 from the embedded controller (EC) 48. Because the positive compensation, the compensated-Vcore-feedback voltage (Vcvf) is accordingly greater than the Vcore-feedback voltage (Vcore_f), so as a relative small core voltage (Vcore) is outputted to the CPU 42 from the PWM controller 46 due to a close-loop equivalence between the PWM controller 46 and the CPU 42.

After the modulation of the core voltage (Vcore), the over clocking can be executed to the CPU 42. The SIN signal, for informing the BIOS 52 to control the clock-frequency generator 50 to generate a higher clock frequency, is first outputted to the BIOS 52 from the embedded controller (EC) 48, accordingly a higher clock frequency (e.g., 10% or 20% higher than prior clock frequency) is generated and outputted to the CPU 42 from the clock-frequency generator 50, so as the raising up of the core voltage (Vcore) and the over clocking (or the lowering down of the core voltage (Vcore) and the over clocking) is achieved.

Similarly, the under clocking can be done according to the same manner if the estimated power consumption of the CPU 42 is down to the predefined minimum-power value or the power consumption indicating the clock frequency of the CPU 42 is in the lowest-frequency mode (LFM), so as the lowing down of the core voltage (Vcore) and the under clocking (or the raising up of the core voltage (Vcore) and the under-clocking) can be done according to the same manner. Therefore, no unnecessary details are given here.

Furthermore, it is to be understood that the invention needs not be limited to modulate both the core voltage (Vcore) and the clock frequency of the CPU at a same time. The present invention can be applied to individually modulate either the core voltage (Vcore) or the clock frequency of the CPU.

Figure 3B:
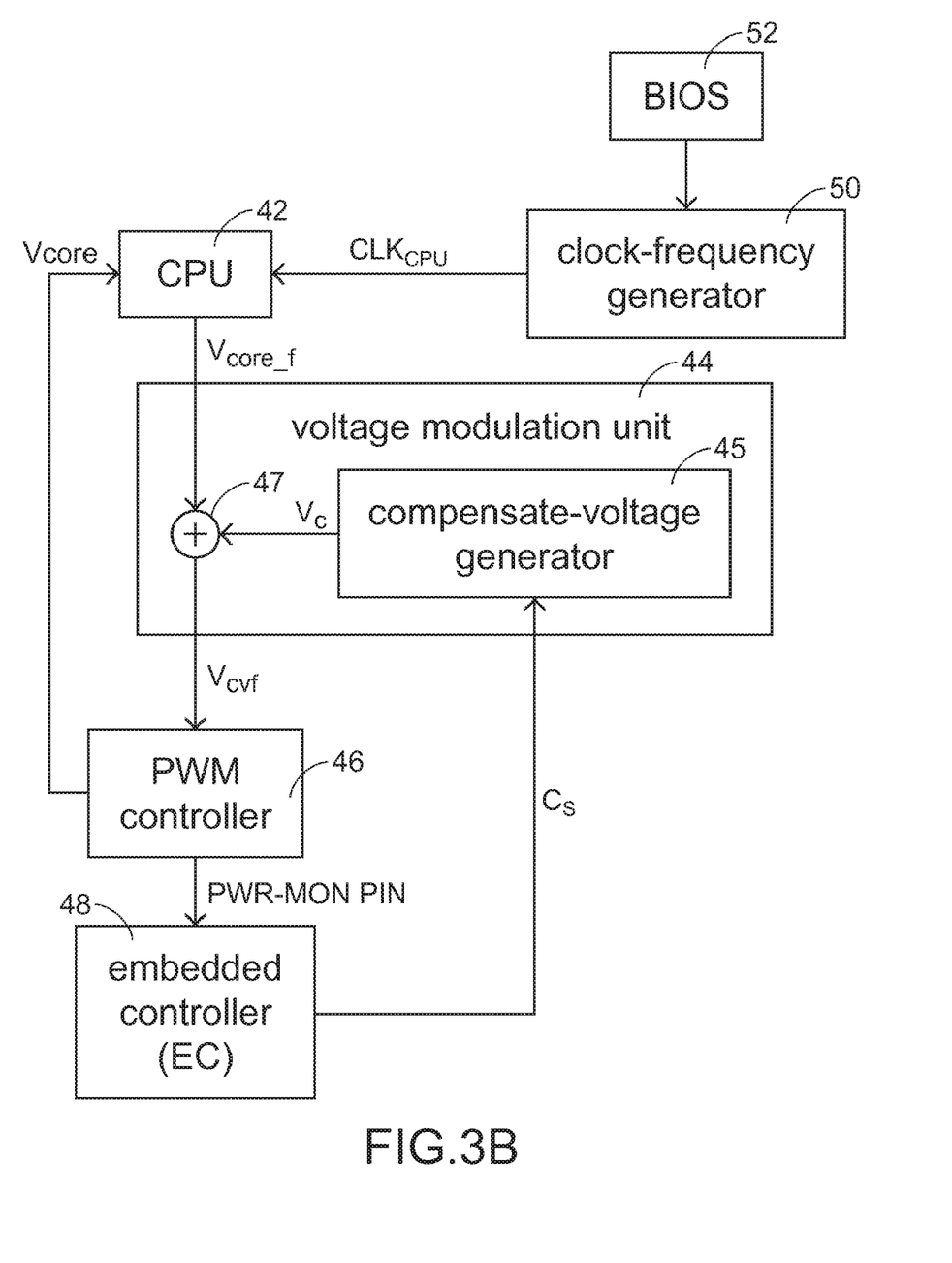
FIG. 3B is a functional block diagram illustrating a computer system of the present invention capable of modulating the core voltage (Vcore) of the CPU.

FIG. 3B is a functional block diagram illustrating a computer system of the present invention capable of modulating the core voltage (Vcore) applied to a CPU. Same as the description above in FIG. 3A, if the estimated power consumption of the CPU 42 is in the range between the predefined maximum-power value and the predefined minimum-power value or the estimated power consumption indicating the clock frequency of the CPU 42 is neither in the highest-frequency mode (HFM) nor in the lowest-frequency mode (LFM), a control signal (Cs) with a specific configuration, for informing the compensate-voltage generator 45 to generate a compensate voltage (Vc) with a value of zero, is outputted to the voltage modulation unit 44 from the embedded controller (EC) 48. Because there is no any modulation to the compensated-Vcore-feedback voltage (Vcvf) due to the compensate voltage (Vc) is zero, the value of the core voltage (Vcore) outputted to the CPU 42 from the PWM controller 46 is accordingly without any value modulation.

Similarly, if the estimated power consumption of the CPU 42 is up to the predefined maximum-power value or the estimated power consumption indicating the clock frequency of the CPU 42 is in the highest-frequency mode (HFM), a control signal (Cs) with a specific configuration, for informing the compensate-voltage generator 45 to generate a compensate voltage (Vc) with a negative value, is outputted to the voltage modulation unit 44 from the embedded controller (EC) 48. Because the value of the compensated-Vcore-feedback voltage (Vcvf) is modulated to less than the Vcore-feedback voltage (Vcore_f) due to the negative compensate voltage (Vc), the value of the core voltage (Vcore) outputted to the CPU 42 from the PWM controller 46 is accordingly raised up, so as the modulation of the core voltage (Vcore) to higher is achieved.

Similarly, if the estimated power consumption of the CPU 42 is down to the predefined minimum-power value or the estimated power consumption indicating the clock frequency of the CPU 42 is in the lowest-frequency mode (LFM), a control signal (Cs) with a specific configuration, for informing the compensate-voltage generator 45 to generate a compensate voltage (Vc) with a positive value, is outputted to the voltage modulation unit 44 from the embedded controller (EC) 48. Because the value of the compensated-Vcore-feedback voltage (Vcvf) is modulated to larger than the Vcore-feedback voltage (Vcore_f) due to the positive compensate voltage (Vc), the value of the core voltage (Vcore) outputted to the CPU 42 from the PWM controller 46 is accordingly lowered down, so as the modulation of the core voltage (Vcore) to lower is achieved.

Figure 3C:
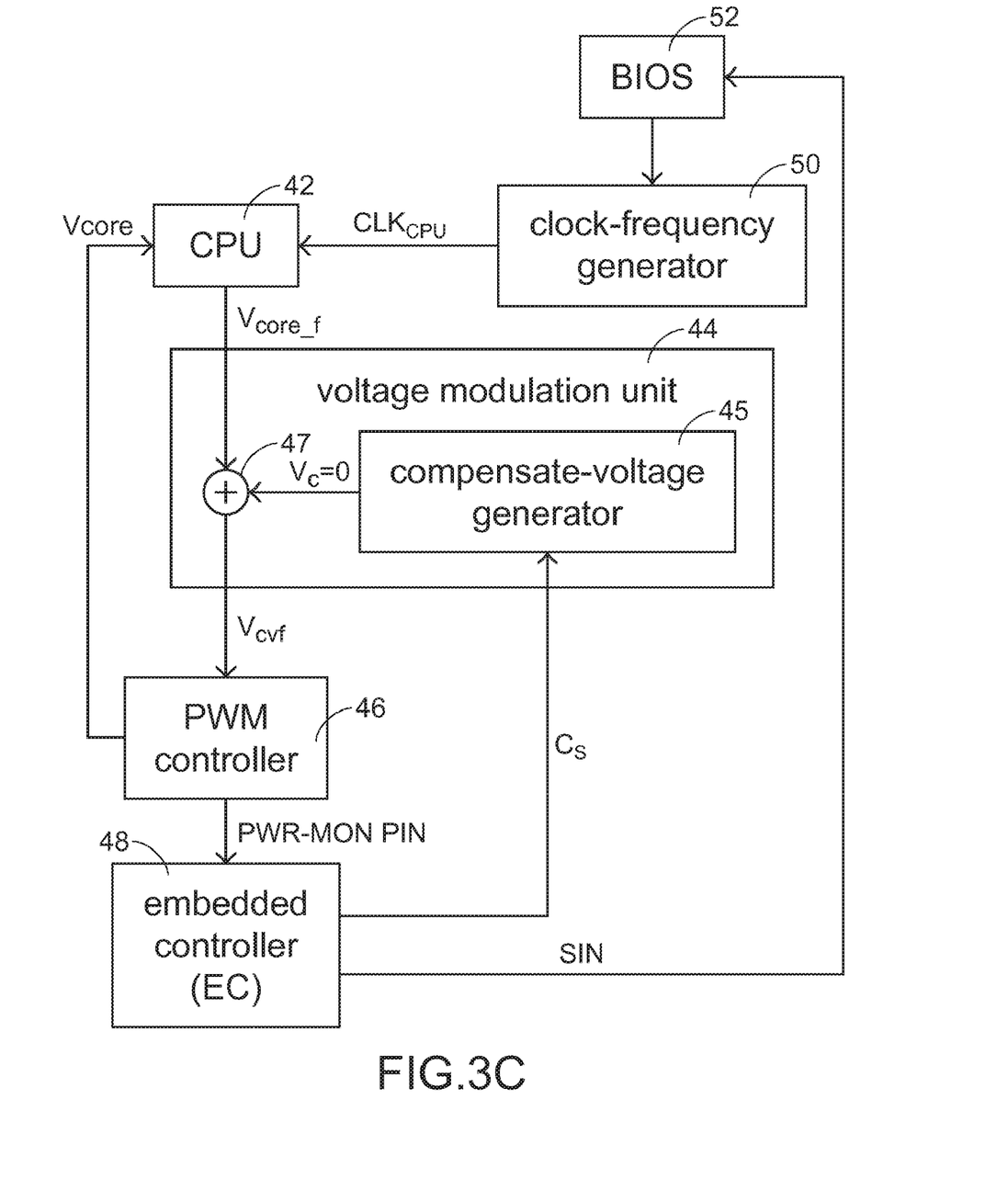
FIG. 3C is a functional block diagram illustrating a computer system of the present invention capable of modulating the clock frequency of the CPU.

FIG. 3C is a functional block diagram illustrating a computer system of the present invention capable of modulating the clock frequency applied to a CPU. Because the FIG. 3C only illustrates the modulation of the clock frequency of the CPU 42, the compensate voltage (Vc), generated in the voltage modulation unit 44 and use for compensating the Vcore-feedback voltage (Vcore_f), is always fixed at zero. Accordingly, the value of the compensated-Vcore-feedback voltage (Vcvf) is equal to the value of the Vcore-feedback voltage (Vcore_f).

If the estimated power consumption of the CPU 42 is in the range between the predefined maximum-power value and the predefined minimum-power value or the estimated power consumption indicating the clock frequency ($CLK_{CPU}$) of the CPU 42 is neither in the highest-frequency mode (HFM) nor in the lowest-frequency mode (LFM), the system interrupt notify (SIN) signal will not outputted to the BIOS 52 from the embedded controller (EC) 48, accordingly there is no any modulation to the clock frequency ($CLK_{CPU}$) outputted from the frequency generator 50 to the CPU 42.

If the estimated power consumption of the CPU 42 is up to the predefined maximum-power value or the estimated power consumption indicating the clock frequency ($CLK_{CPU}$) of the CPU 42 is in the highest-frequency mode (HFM), the system interrupt notify (SIN) signal, for informing the BIOS 52 to control the clock-frequency generator 50 to generate a higher clock frequency ($CLK_{CPU}$), is outputted to the BIOS 52 from the embedded controller (EC) 48, accordingly a higher clock frequency (10% or 20% higher than prior clock frequency) is outputted to the CPU 42 from the frequency generator 50, so as the over clocking is achieved.

If the estimated power consumption of the CPU 42 is down to the predefined minimum-power value or the estimated power consumption indicating the clock frequency ($CLK_{CPU}$) of the CPU 42 is in the lowest-frequency mode (LFM), the system interrupt notify (SIN) signal, for informing the BIOS 52 to control the clock-frequency generator 50 to generate a lower clock frequency ($CLK_{CPU}$), is outputted to the BIOS 52 from the embedded controller (EC) 48, accordingly a lower clock frequency (10% or 20% lower than prior clock frequency) is outputted to the CPU 42 from the frequency generator 50, so as the under clocking is achieved.

Figure 4A:
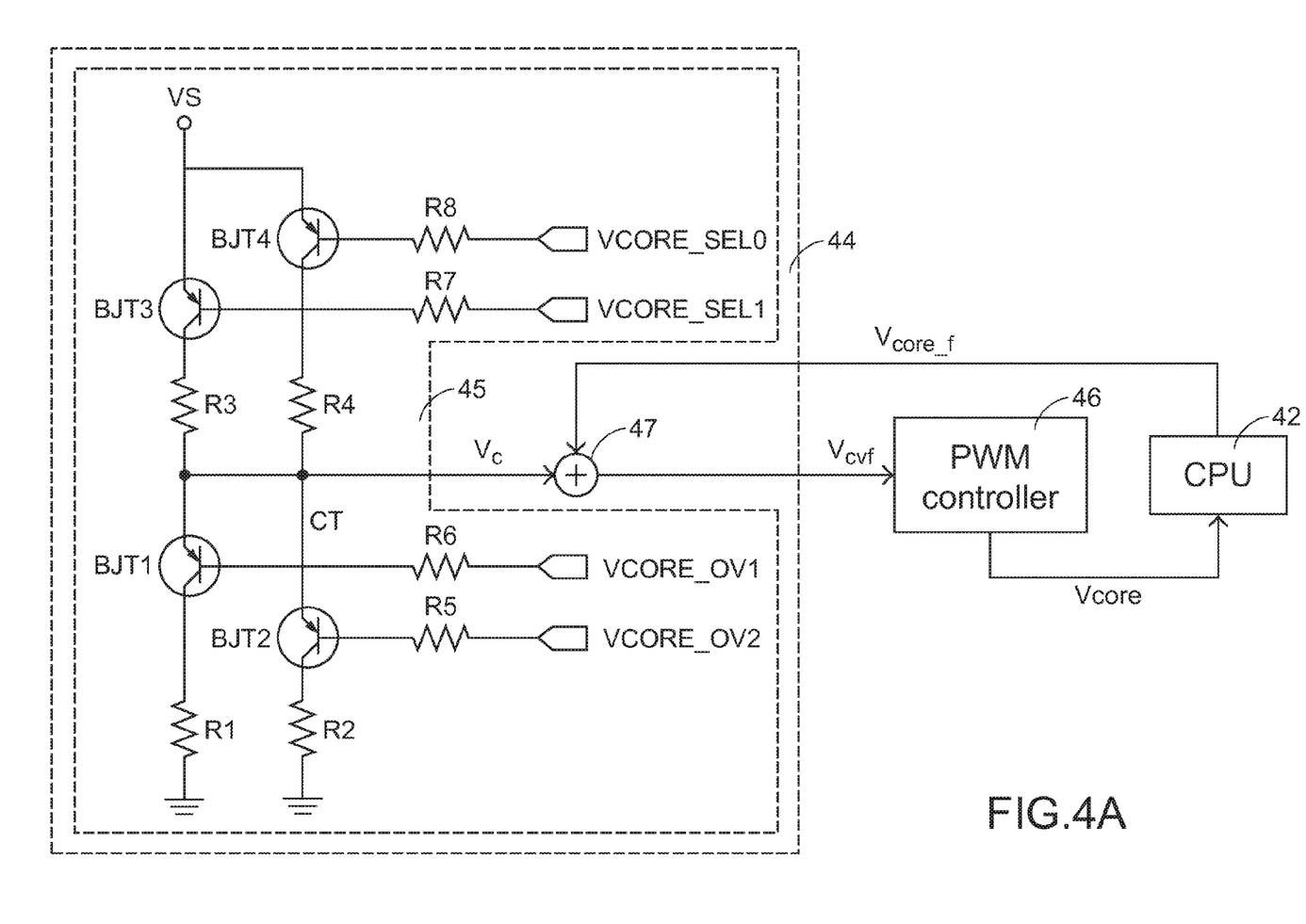
FIG. 4A is a circuit diagram of the voltage modulation unit arranged in the present invention.

FIG. 4A is a circuit diagram of the voltage modulation unit arranged in the present invention. The voltage modulation unit 44, connected to the PWM controller 46 that is further connected to the CPU 42, comprises a compensate-voltage generator 45 and an adder 47 from which the compensated-Vcore-feedback voltage (Vcvf), sum of the compensate voltage (Vc) and the Vcore-feedback voltage (Vcore_f), is outputted to the PWM controller 46. The compensate-voltage generator 45 further comprises four BJTs (BIT1, BJT2, BJT3, BJT4) and eight resistors (R1, R2, R3, R4, R5, R6, R7, R8), where the four BJTs (BIT1, BJT2, BJT3, BJT4) are pnp-type BJTs.

As depicted in FIG. 4A, the collector terminal (C) of the BJT1 is connected to ground via the resistor R1; the base terminal (B) of the BJT1 is connected to the resistor R6 to which a first bit of the control signal (VCORE_OV1) is inputted from the embedded controller (EC) 48 (not shown); and the emitter terminal (E) of the BJT1 is connected to a compensate terminal (CT) from which the compensate voltage (Vc) is outputted. The collector terminal (C) of the BJT2 is connected to ground via the resistor R2; the base terminal (B) of the BJT2 is connected to the resistor R5 to which a second bit of the control signal (VCORE_OV2) is inputted from the embedded controller (EC) 48; and the emitter terminal (E) of the BJT2 is connected to the compensate terminal (CT). The collector terminal (C) of the BJT3 is connected to the compensate terminal (CT) via the resistor R3; the base terminal (B) of the BJT3 is connected to the resistor R7 to which a third bit of the control signal (VCORE_SEL1) is inputted from the embedded controller (EC) 48; and the emitter terminal (E) of the BJT3 is connected to a voltage-power source (VS). The collector terminal (C) of the BJT4 is connected to the compensate terminal (CT) via the resistor R4; the base terminal (B) of the BJT4 is connected to the resistor R8 to which a fourth bit of the control signal (VCORE_SEL0) is inputted from the embedded controller (EC) 48; and the emitter terminal (E) of the BJT4 is connected to the voltage-power source (VS).

Figure 4B:
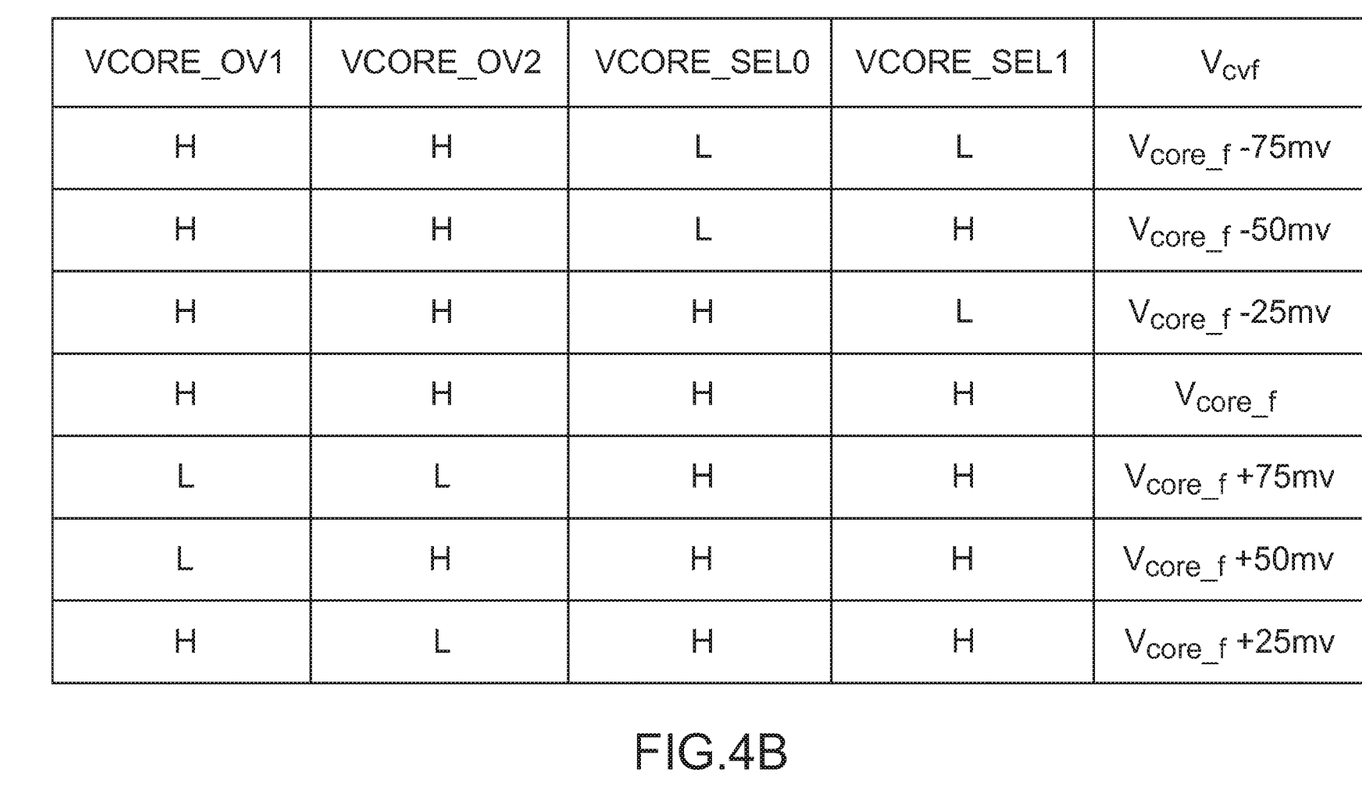
FIG. 4B is a table illustrating seven compensated-Vcore-feedback voltages (Vcvf) corresponding to seven configurations of the control signal.

FIG. 4B is a table illustrating seven compensated-Vcore-feedback voltages (Vcvf) correspondingly generated by seven configurations of the four bits of the control signal (VCORE_OV1, VCORE_OV2, VCORE_SEL0, VCORE_SEL1).

If the power consumption of the CPU 42 is estimated in the range between the predefined maximum-power value and the predefined minimum-power value or the estimated power consumption indicating the core voltage (Vcore) applied to the CPU 42 is not necessary to be raised up or lowered down, a specific configuration of the control signal (such as VCORE_OV1=H, VCORE_OV2=H, VCORE_SEL0=H, VCORE_SEL1=H) is outputted to the voltage modulation unit 44 from the embedded controller (EC) 48. Because the specific configuration of the control signal (VCORE_OV1=H, VCORE_OV2=H, VCORE_SEL0=H, VCORE_SEL1=H), all the four BJTs (BIT1, BJT2, BJT3, BJT4) are turn-off, so as a positive voltage, from the voltage-power source (VS), cannot be transmitted to the PWM controller 46 sequentially via the turn-off BJT3 and resistor R3 (or the turn-off BJT4 and resistor R4); and, the ground cannot drain the voltage power from the PWM controller 46 sequentially via the turn-off BJT1 and resistor R1 (or the turn-off BJT2 and resistor R2). Therefore, a compensate voltage (Vc) with a value of zero is generated at the compensate terminal (CT) of compensate-voltage generator 45 and then transmitted to the adder 47. As depicted in FIG. 4B, the compensated-Vcore-feedback voltage (Vcvf) is accordingly equal to the Vcore-feedback voltage (Vcore_f), so as no any modulation to the core voltage (Vcore) outputted to the CPU 42 from the PWM controller 46.

If the power consumption of the CPU 42 is estimated down to the predefined minimum-power value or the estimated power consumption indicating the core voltage (Vcore) applied to the CPU 42 is necessary to lower down, a specific configuration of the control signal, such as the first three configurations of the control signal (depicted in FIG. 4B) for turning off both the two BJTs (BJT1, BJT2) and turning on both/or either the two BJTs (BJT3, BJT4), can be selected to output to the voltage modulation unit 44 from the embedded controller (EC) 48. For example, if the control signal with the specific configuration (such as VCORE_OV1=H, VCORE_OV2=H, VCORE_SEL0=L, VCORE_SEL1=L) is selected, the two BJTs (BIT1, BJT2) are turn-off but the two BJTs (BJT3, BJT4) are turn-on, so as a positive voltage, from the voltage-power source (VS), can be transmitted to the PWM controller 46 sequentially via the turn-on BJT3 and resistor R3 (or the turn-on BJT4 and resistor R4); but, the ground cannot drain the voltage power from the PWM controller 46 sequentially via the turn-off BJT1 and resistor R1 (or the turn-off BJT2 and resistor R2). Therefore, a largest compensated voltage (Vc, e.g., 75 mV) is generated and outputted to the adder 47 from the compensate terminal (CT) of compensate-voltage generator 45, so as a largest compensated-Vcore-feedback voltage (Vcvf) with a value of the Vcore-feedback voltage (Vcore_f) added by 75 mV is obtained. Moreover, for achieving a close-loop equivalence between the PWM controller 46 and the CPU 42, the PWM controller 46 accordingly will modulate the outputting core voltage (Vcore) to be subtracted by 75 mV, compared to the prior core voltage (Vcore). Then, the lowering down of the core voltage (Vcore) applied to the CPU 42 is achieved.

If the power consumption of the CPU 42 is estimated up to the predefined maximum-power value or the estimated power consumption indicating the core voltage (Vcore) applied to the CPU 42 is necessary to raise up, a specific configuration of the control signal, such as the last three configurations of the control signals (depicted in FIG. 4B) for turning off both the two BJTs (BJT3, BJT4) and turning on both/or either the two BJTs (BJT1, BJT2), can be selected to output to the voltage modulation unit 44 from the embedded controller (EC) 48. For example, if the control signal with the specific configuration (such as VCORE_OV1=L, VCORE_OV2=L, VCORE_SEL0=H, VCORE_SEL1=H) is selected, the two BJTs (BIT3, BJT4) are turn-off but the two BJTs (BJT1, BJT2) are turn-on, so as a positive voltage, from the voltage-power source (VS), cannot be transmitted to the PWM controller 46 sequentially via the turn-off BJT3 and resistor R3 (or the turn-off BJT4 and resistor R4); but, the ground can drain the voltage power from the PWM controller 46 sequentially via the turn-on BJT1 and resistor R1 (or the turn-on BJT2 and resistor R2). Therefore, a smallest compensated voltage (Vc, e.g., −75 mV) is generated and outputted to the adder 47 from the compensate terminal (CT) of compensate-voltage generator 45, so as a smallest compensated-Vcore-feedback voltage (Vcvf) with a value of the Vcore-feedback voltage (Vcore_f) subtracted from 75 mV is obtained. Similarly, for achieving a close-loop equivalence between the PWM controller 46 and the CPU 42, the PWM controller 46 accordingly will modulate the outputting core voltage (Vcore) to be added by 75 mV, compared to the prior core voltage (Vcore). Then, the raising up of the core voltage (Vcore) applied to the CPU 42 is achieved.

To sum up, even the CPU is without the EIST function, the core voltage (Vcore) and the clock frequency of the CPU in the computer system of the present invention can be dynamically modulated based on the real-time load of the CPU. Furthermore, because the modulation of the core voltage (Vcore) of the CPU in the computer system can be achieved without via the BIOS, all the over clocking, under clocking, raising up the core voltage (Vcore), or lowering down the core voltage (Vcore) of the CPU can be done without a complicate process. Furthermore, the core voltage (Vcore) of the CPU can be flexibly modulated (raising up or lowering down) based on different requirement before the execution of the over clocking and the under clocking, so as the performance and the power saving can be more balanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system capable of modulating a voltage and a frequency of a central processing unit, comprising:
 a central processing unit capable of receiving a voltage and then generating a feedback voltage;
 a pulse-width-modulation controller capable of modulating and outputting the voltage in response to a compensated-feedback voltage, and capable of monitoring a real-time load of the central processing unit and then generating a power monitor signal;
 an embedded controller for determining a power consumption of the central processing unit in response to the power monitor signal and then generating a control signal and a system interrupt notify signal;
 a voltage modulation unit capable of generating a compensate voltage in response to the control signal;
 a clock-frequency generator for generating a clock with a first frequency to the central processing unit; and
 a basic-input-output-system for modulating the first frequency of the clock based on the system interrupt notify signal;
 wherein the compensated-feedback voltage is equal to the feedback voltage added to the compensate voltage and wherein the compensate voltage is non-zero.

2. The computer system capable of modulating a voltage and a frequency of a central processing unit according to claim 1, wherein a predefined maximum-power value and a predefined minimum-power value are stored in the embedded controller, and the control signal is outputted to the voltage modulation unit to make the compensated-feedback voltage unequal to the feedback voltage if the power consumption of the central processing unit is up to or down to the predefined maximum-power value or the predefined minimum-power value.

3. The computer system capable of modulating a voltage and a frequency of a central processing unit according to claim 2, wherein the value of the compensate voltage is modulated to zero if the power consumption of the central processing unit is in the range between the predefined maximum-power value and the predefined minimum-power value; or, the value of the compensate voltage is modulated to negative if the power consumption of the central processing unit is greater than the predefined maximum-power value; or, the value of the compensate voltage is modulated to positive if the power consumption of the central processing unit is less than the predefined minimum-power value.

4. The computer system capable of modulating a voltage and a frequency of a central processing unit according to claim 2, wherein the first frequency is modulated to a second frequency if the power consumption of the central processing unit is greater than the predefined maximum-power value; or, the first frequency is modulated to a third frequency if the power consumption of the central processing unit is less than the predefined minimum-power value; wherein the second frequency is greater than the first frequency and the first frequency is greater than the third frequency.

5. The computer system capable of modulating a voltage and a frequency of a central processing unit according to claim 1, wherein the voltage modulation unit further comprises an adder and a compensate-voltage generator; wherein the compensate voltage is generated by the compensate-voltage generator after receiving the control signal and the compensated-feedback voltage is equal to the feedback voltage added to the compensate voltage via the adder.

6. The computer system capable of modulating a voltage and a frequency of a central processing unit according to claim 5, wherein the control signal have 4 bits and the compensate-voltage generator further comprises:
 a first resistor;
 a first transistor comprising a base terminal connected to the first bit of the control signal, an emitter terminal connected to a compensate terminal from which the compensate voltage is outputted, and a collector terminal connected to ground via the first resistor;
a second resistor;
a second transistor comprising a base terminal connected to the second bit of the control signal, an emitter terminal connected to the compensate terminal, and a collector terminal connected to ground via the second resistor;
a third resistor;
a third transistor comprising a collector terminal connected to the compensate terminal via the third resistor, a base terminal connected to the third bit of the control signal, and an emitter terminal connected to a voltage-power source;
a fourth resistor; and
a fourth transistor comprising a collector terminal connected to the compensate terminal via the fourth resistor, a base terminal connected to the fourth bit of the control signal, and an emitter terminal connected to the voltage-power source.

7. A computer system capable of modulating a voltage of a central processing unit, comprising:
a central processing unit capable of receiving the voltage and then generating a feedback voltage;
a pulse-width-modulation controller capable of modulating and outputting the voltage in response to a compensated-feedback voltage, and capable of monitoring a real-time load of the central processing unit and then generating a power monitor signal;
an embedded controller for determining a power consumption of the central processing unit in response to the power monitor signal and then generating a control signal; and
a voltage modulation unit capable of generating a compensate voltage in response to the control signal;
wherein the compensated-feedback voltage is equal to the feedback voltage added to the compensate voltage.

8. The computer system capable of modulating a voltage of a central processing unit according to claim 7, wherein a predefined maximum-power value and a predefined minimum-power value are stored in the embedded controller, and the control signal is outputted to the voltage modulation unit to make the compensated-feedback voltage unequal to the feedback voltage if the power consumption of the central processing unit is up to or down to the predefined maximum-power value or the predefined minimum-power value.

9. The computer system capable of modulating a voltage of a central processing unit according to claim 8, wherein the value of the compensate voltage is modulated to zero if the power consumption of the central processing unit is in the range between the predefined maximum-power value and the predefined minimum-power value; or, the value of the compensate voltage is modulated to negative if the power consumption of the central processing unit is greater than the predefined maximum-power value; or, the value of the compensate voltage is modulated to positive if the power consumption of the central processing unit is less than the predefined minimum-power value.

10. The computer system capable of modulating a voltage of a central processing unit according to claim 9, wherein the voltage modulation unit further comprises an adder and a compensate-voltage generator; wherein the compensate voltage is generated by the compensate-voltage generator after receiving the control signal and the compensated-feedback voltage is equal to the feedback voltage added to the compensate voltage via the adder.

11. The computer system capable of modulating a voltage of a central processing unit according to claim 10, wherein the control signal have 4 bits and the compensate-voltage generator further comprises:
a first resistor;
a first transistor comprising a base terminal connected to the first bit of the control signal, an emitter terminal connected to a compensate terminal from which the compensate voltage is outputted, and a collector terminal connected to ground via the first resistor;
a second resistor;
a second transistor comprising a base terminal connected to the second bit of the control signal, an emitter terminal connected to the compensate terminal, and a collector terminal connected to ground via the second resistor;
a third resistor;
a third transistor comprising a collector terminal connected to the compensate terminal via the third resistor, a base terminal connected to the third bit of the control signal, and an emitter terminal connected to a voltage-power source;
a fourth resistor; and
a fourth transistor comprising a collector terminal connected to the compensate terminal via the fourth resistor, a base terminal connected to the fourth bit of the control signal, and an emitter terminal connected to the voltage-power source.

12. A computer system capable of modulating a frequency of a central processing unit, comprising:
a central processing unit capable of receiving a voltage and then generating a feedback voltage;
a pulse-width-modulation controller capable of modulating and outputting the voltage in response to a compensated-feedback voltage, and capable of monitoring a real-time load of the central processing unit and then generating a power monitor signal~wherein the value of the compensated-feedback voltage is equal to the value of the feedback voltage added to a compensate voltage;
an embedded controller for determining a power consumption of the central processing unit in response to the power monitor signal and then generating a system interrupt notify signal;
a clock-frequency generator for generating a clock with a first frequency to the central processing unit; and
a basic-input-output-system for modulating the first frequency of the clock based on the system interrupt notify signal.

13. The computer system capable of modulating a frequency of a central processing unit according to claim 12, wherein a predefined maximum-power value and a predefined minimum-power value are stored in the embedded controller, and the first frequency is modulated to a second frequency if the power consumption of the central processing unit is greater than the predefined maximum-power value; and, the first frequency is modulated to a third frequency if the power consumption of the central processing unit is less than the predefined minimum-power value; wherein the second frequency is greater than the first frequency and the first frequency is greater than the third frequency.

14. The computer system capable of modulating a frequency of a central processing unit according to claim 13, further comprising a voltage modulation unit capable of generating the compensate voltage in response to a control signal generated by the embedded controller.

15. The computer system capable of modulating a frequency of a central processing unit according to claim 14, wherein the voltage modulation unit further comprises an adder and a compensate-voltage generator; wherein the compensate voltage is generated by the compensate-voltage generator after receiving the control signal and the compensated-feedback voltage is equal to the feedback voltage added to the compensate voltage via the adder.

16. The computer system capable of modulating a frequency of a central processing unit according to claim 15, wherein the control signal have 4 bits and the compensate-voltage generator further comprises:
   a first resistor;
   a first transistor comprising a base terminal connected to the first bit of the control signal, an emitter terminal connected to a compensate terminal from which the compensate voltage is outputted, and a collector terminal connected to ground via the first resistor;
   a second resistor;
   a second transistor comprising a base terminal connected to the second bit of the control signal, an emitter terminal connected to the compensate terminal, and a collector terminal connected to ground via the second resistor;
   a third resistor;
   a third transistor comprising a collector terminal connected to the compensate terminal via the third resistor, a base terminal connected to the third bit of the control signal, and an emitter terminal connected to a voltage-power source;
   a fourth resistor; and
   a fourth transistor comprising a collector terminal connected to the compensate terminal via the fourth resistor, a base terminal connected to the fourth bit of the control signal, and an emitter terminal connected to the voltage-power source.

* * * * *